United States Patent
Obata et al.

(10) Patent No.: US 12,291,629 B2
(45) Date of Patent: May 6, 2025

(54) METHOD OF MANUFACTURING A MOLDED ARTICLE

(71) Applicant: IDEMITSU KOSAN CO., LTD., Tokyo (JP)

(72) Inventors: Yutaka Obata, Ichihara (JP); Yasunari Okada, Ichihara (JP); Tomoaki Takebe, Ichihara (JP)

(73) Assignee: IDEMITSU KOSAN CO., LTD., Tokyo (JP)

(*) Notice: Subject to any disclaimer, the term of this patent is extended or adjusted under 35 U.S.C. 154(b) by 391 days.

(21) Appl. No.: 17/763,140

(22) PCT Filed: Sep. 24, 2020

(86) PCT No.: PCT/JP2020/036049
§ 371 (c)(1),
(2) Date: Mar. 23, 2022

(87) PCT Pub. No.: WO2021/060381
PCT Pub. Date: Apr. 1, 2021

(65) Prior Publication Data
US 2022/0363881 A1    Nov. 17, 2022

(30) Foreign Application Priority Data
Sep. 27, 2019  (JP) .................... 2019-177415

(51) Int. Cl.
*B29C 45/00* (2006.01)
*B29C 45/27* (2006.01)
(Continued)

(52) U.S. Cl.
CPC .......... *C08L 23/22* (2013.01); *B29C 45/0001* (2013.01); *B29C 45/2708* (2013.01); *B29C 45/53* (2013.01); *B29C 45/73* (2013.01); *C08L 33/10* (2013.01); *B29K 2023/18* (2013.01); *B29K 2033/04* (2013.01)

(58) Field of Classification Search
CPC ..................... B29C 45/0001; B29C 45/53
See application file for complete search history.

(56) References Cited

U.S. PATENT DOCUMENTS

2011/0287242 A1   11/2011   Kanagawa et al.
2016/0362576 A1   12/2016   Asanuma et al.
(Continued)

FOREIGN PATENT DOCUMENTS

CN    106062022 A    10/2016
CN    109072027 A    12/2018
(Continued)

OTHER PUBLICATIONS

Office Action issued in corresponding Chinese Patent Application No. 202080067015.3 dated Sep. 2, 2023 (7 pages).
(Continued)

*Primary Examiner* — Edmund H Lee
(74) *Attorney, Agent, or Firm* — Foley & Lardner LLP

(57) ABSTRACT

A thermosetting composition comprising the following component (A) and component (B), and having a viscosity of 0.1 Pa·s or higher and 100 Pa·s or lower at a shear rate of 10 s$^{-1}$ at 25° C. measured in accordance with JIS K7117-2.
(A) polybutadiene having a structural unit represented by the following formula (1A) and a structural unit represented by the following formula (1B), wherein the terminal group comprises a methacryloyl group or an acryloyl group
(B) a thermal polymerization initiator (1A)

(Continued)

-continued (1B)

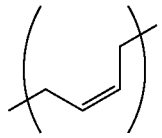

6 Claims, 2 Drawing Sheets

(51) Int. Cl.
*B29C 45/53* (2006.01)
*B29C 45/73* (2006.01)
*C08L 23/22* (2006.01)
*C08L 33/10* (2006.01)
*B29K 23/00* (2006.01)
*B29K 33/04* (2006.01)

(56) References Cited

U.S. PATENT DOCUMENTS

| | | |
|---|---|---|
| 2016/0362587 A1 | 12/2016 | Aoyama et al. |
| 2019/0119528 A1 | 4/2019 | Seo et al. |
| 2020/0157257 A1 | 5/2020 | Obata et al. |

FOREIGN PATENT DOCUMENTS

| | | |
|---|---|---|
| JP | H08-272208 A | 10/1996 |
| JP | H09-194546 A | 7/1997 |
| JP | 2003-034709 A | 2/2003 |
| JP | 2008-280414 A | 11/2008 |
| JP | 2012-131074 A | 7/2012 |
| JP | 2012-208501 A | 10/2012 |
| JP | 2014-189575 A | 10/2014 |
| JP | 2015-160921 A | 9/2015 |
| JP | 2015-162415 A | 9/2015 |
| JP | 2016-008230 A | 1/2016 |
| JP | 2019-011447 A | 1/2019 |
| JP | 2019-506477 A | 3/2019 |
| WO | WO-2009/107301 A1 | 6/2011 |
| WO | WO-2013/180051 A1 | 12/2013 |
| WO | WO2015198580 | * 12/2015 |

OTHER PUBLICATIONS

International Preliminary Report on Patentability received in PCT Application No. PCT/JP2020/036049 dated Apr. 7, 2022 translated (7 pages).
International Search Report and Written Opinion received in PCT Application No. PCT/JP2020/036049 dated Dec. 8, 2020 with translation (14 pages).
Office Action issued in corresponding Indian Patent Application No. 202247015374 dated Aug. 8, 2024 (6 pages).

* cited by examiner

METHOD OF MANUFACTURING A MOLDED ARTICLE

CROSS-REFERENCE TO RELATED APPLICATIONS

The present application claims priority under 37 U.S.C. § 371 to International Patent Application No. PCT/JP2020/036049, filed Sep. 24, 2020, which claims priority to and the benefit of Japanese Patent Application No. 2019-177415, filed on Sep. 27, 2019. The contents of these applications are hereby incorporated by reference in their entireties.

TECHNICAL FIELD

The invention relates to a thermosetting composition, a method of manufacturing a molded article using the same, and a cured product.

BACKGROUND ART

In electrical and electronic components, a variety of thermosetting resins are used as materials for a wide variety of applications.

For example, thermosetting resin such as epoxy resin, imide resin, amide-imide resin, unsaturated polyester resin and phenolic resin is used as semiconductor sealing resin, impregnated resin for rotation, insulating varnish, an insulating material for a printed wiring board, impregnated resin for a printed wiring board, a coating agent for an electronic component, a sealing agent, a conformal coating, a potting agent for an electronic component, an adhesive for an electrical component or an electronic component, a compound for heat-radiation of an electronic component or the like.

Further, it has been proposed to use a polymer having a functional group of a silicone type, a polyether type, and an isocyanate type, and urethane resin as thermosetting resin (see, for example, Patent Documents 1 to 4).

RELATED ART DOCUMENTS

Patent Documents

[Patent Document 1] JP H08-272208A
[Patent Document 2] JP 2008-280414 A
[Patent Document 3] WO 2009/107301 A
[Patent Document 4] JP 2003-34709 A

SUMMARY OF THE INVENTION

It is an object of the invention to provide a thermosetting composition capable of forming a cured product excellent in sealability and excellent in moldability, a method of manufacturing a molded article using the same, and a cured product.

The thermosetting resins of Patent Documents 1 to 4 described above are usually applied by a spin coater or the like and used. The thermosetting resins of Patent Documents 1 to 4 are also used by dipping. As other molding methods, molding using a potting device, applying using various dispensers, coating, and the like are known.

The inventors have reached a problem that a photolithography process is necessary in view of connection of wiring in spin coating. In addition, it was considered that spin coating could not be used for three-dimensional objects. In dipping, it was thought that the electric circuit in the object may be eroded by the solvent or the like.

Accordingly, as a result of extensive studies, the inventors have found that injection molding may be used, and as a result of further studies, the invention has been completed by combining specific components.

According to the invention, the following thermosetting composition and the like are provided.

1. A thermosetting composition comprising the following component (A) and component (B), and having a viscosity of 0.1 Pa·s or higher and 100 Pa·s or lower at a shear rate of $10\ s^{-1}$ at 25° C. measured in accordance with JIS K7117-2.

(A) polybutadiene having a structural unit represented by the following formula (1A) and a structural unit represented by the following formula (1B), wherein the terminal group comprises a methacryloyl group or an acryloyl group (B) a thermal polymerization initiator (1A)

(1B)

2. The thermosetting composition according to 1, further comprising (C) an acrylate compound or a methacrylate compound.

3. The thermosetting composition according to 1 or 2, which is for an electric member or an electronic member.

4. A method of manufacturing a molded article, comprising the steps of: supplying the thermosetting composition according to any one of 1 to 3 into a plunger;

filling the supplied thermosetting composition into a depressurized molding part of a mold by the plunger; and thermosetting the filled thermosetting composition in the molding part.

5. The method of manufacturing a molded article according to 4, wherein the temperature of the mold part constituting the molding part is 50 to 150° C.

6. The method of manufacturing a molded article according to 4 or 5, wherein a flow path controlled at a temperature of 50° C. or less is provided between the plunger and the molding part, and the filling is performed through the flow path.

7. The method of manufacturing a molded article according to 6, wherein the flow path has a gate system for blocking the flow of the thermosetting composition and the transfer of heat.

8. The method of manufacturing a molded article according to 7, wherein the filling is performed by opening a gate of the gate system; and in the thermosetting, pressure retention is performed; and after the pressure retention, the gate of the gate system is closed to complete thermosetting.

9. The method for manufacturing a molded article according to any one of 4 to 8, wherein the step of filling and the step of thermosetting are performed in 0.2 to 3 minutes.

10. A cured product, which is manufactured using the thermosetting composition according to any one of 1 to 3.

11. The cured product according to 10, which is a molded article.

According to the invention, it is possible to provide a thermosetting composition capable of forming a cured product excellent in sealability and excellent in moldability, a method of manufacturing a molded article using the same, and a cured product.

MODE FOR CARRYING OUT THE INVENTION

In this specification, a term "XX to YY carbon atoms" in an expression of "substituted or unsubstituted ZZ group including XX to YY carbon atoms" represents the number of carbon atoms when the ZZ group is unsubstituted. The number of carbon atoms of a substituent when the ZZ group is substituted is not included. Here, "YY" is larger than "XX", and "XX" and "YY" independently mean an integer of 1 or more.

In this specification, a term "XX to YY atoms" in an expression of "substituted or unsubstituted ZZ group including XX to YY atoms" represents the number of atoms when the ZZ group is unsubstituted. The number of atoms of a substituent when the group is substituted is not included. Here, "YY" is larger than "XX", and "XX" and "YY" independently mean an integer of 1 or more.

The term "unsubstituted" in the context of "a substituted or unsubstituted" means that the substituent is not bonded and a hydrogen atom is bonded.

In this specification, acrylate and methacrylate are collectively referred to as (meth)acrylate. Acrylic acid and methacrylic acid are collectively referred to as (meth)acrylic acid. Acrylo and methacrylo are collectively referred to as (meth)acrylo. Acrylic and methacrylic are collectively referred to as (meth)acrylic. A methacryloyl group and an acryloyl group are collectively referred to as a (meth) acryloyl group.

The thermosetting composition of the invention contains the following component (A) and component (B), and has a viscosity of 0.1 Pa·s or higher and 100 Pa·s or lower at a shear rate of 10 s$^{-1}$ at 25° C. measured in accordance with JIS K7117-2.

(A) polybutadiene having a structural unit represented by the following formula (1A) and a structural unit represented by the following formula (1B), wherein the terminal group comprises a methacryloyl group or an acryloyl group (B) a thermal polymerization initiator (1A)

(1B)

This provides excellent moldability, for example, reduced curing time.

This also allows for the formation of a cured article excellent in sealability (waterproofness).

Sealability refers to the barrier property of electrical parts, electronic parts, and electrical circuits against moisture, oil, water vapor, etc. Sealability also refers to protecting electrical parts, electronic parts, and electric circuits from metallic foreign object.

Moldability may include, for example, good fillability, little curing defect, being able to obtain a molded article without requiring special techniques, being able to obtain a molded article in a short time, being able to continue molding continuously, and being able to shorten the molding cycle from filling into electronic components and electrical circuits to curing.

In addition, as an arbitrary effect, the injection molding can be performed satisfactorily without causing a curing defect, for example, the molded article can be separated well at the boundary between the heated part and the cold part.

Further, as an arbitrary effect, the storage property can be improved.

Further, as an arbitrary effect, a uniformly cured product can be formed.

Further, as an arbitrary effect, a cured product having excellent electrical insulation and uniform electrical insulation can be formed.

Further, as an arbitrary effect, a cured product excellent in electrode modification resistance can be formed.

Further, as an arbitrary effect, a cured product excellent in fillability and thereby uniformly cured, having uniform electrical insulation, and excellent in electrode modification resistance can be formed.

From the viewpoint of sealability and moldability, the thermosetting composition of the invention is preferably for an electric member or an electronic member.

In addition, the thermosetting composition of the invention is preferably a material for injection molding from the viewpoint of sealability and moldability.

From the viewpoint of sealability and moldability, the thermosetting composition of the invention is preferably uniform. Uniform refers to a state of a composition in which a thermosetting composition is easily cured, hardly discolored, uncured curing is reduced, and variations in composition distribution are reduced.

A viscosity at a shear rate of 10 s$^{-1}$ at 25° C. is 0.1 to 100 Pa·s, more preferably 0.2 to 70 Pa·s.

The measurement of the viscosity, in accordance with JIS K7117-2, at a constant shear rate by means of a rotary viscometer, is measured using a viscoelastic measuring device.

The terminal group of the component (A) contains a methacryloyl group or an acryloyl group. From the viewpoint of sealability and moldability, the terminal group of the component (A) is preferably a (meth)acryloyl group.

From the viewpoint of sealability and moldability, it is preferable that the component (A) further contain a structural unit represented by the following formula (1C).

(1C)

From the viewpoint of flexibility, the molar ratio (mol %) of "the structural unit represented by the formula (1A): the structural unit represented by the formula (1B)" is preferably 0.85:0.15 to 0.20:0.80, more preferably 0.82:0.18 to 0.25:0.75, and still more preferably 0.82:0.18 to 0.50:0.50.

When the structural unit represented by the formula (1C) is contained, from a viewpoint of rubber elastic properties, the molar ratio (mol %) of "(the structural unit represented by the formula (1A)+a structural unit represented by the formula (1B)): the structural unit represented by the formula (1C)" is preferably 0.25:0.75 to 0.99:0.01, more preferably 0.65:0.35 to 0.98:0.02, and still more preferably 0.70:0.30 to 0.95:0.05.

The component (A) may be used alone or in combination of two or more.

The thermosetting composition of the invention contains a component (B). Thereby, a stable molded article can be obtained, for example, the curing time can be shortened and the margin of the curing time can be narrowed.

The component (B) is not particularly limited, and examples thereof include a radical polymerization initiator.

The radical polymerization initiator is not particularly limited, and examples thereof include ketone peroxides, hydroperoxides, diacyl peroxides, dialkyl peroxides, peroxyketals, alkyl peresters (peroxyesters), peroxycarbonates, and the like.

Specific examples of the ketone peroxides include methyl ethyl ketone peroxide, methyl isobutyl ketone peroxide, acetylacetone peroxide, cyclohexanone peroxide, methylcyclohexanone peroxide, and the like.

Specific examples of the hydroperoxides include 1,1,3,3-tetramethylbutyl hydroperoxide, cumene hydroperoxide, t-butyl hydroperoxide, p-menthane hydroperoxide, diisopropylbenzene hydroperoxide, and the like.

Specific examples of the diacyl peroxides include diisobutyryl peroxide, bis-3,5,5-trimethylhexanol peroxide, dilauroyl peroxide, dibenzoyl peroxide, m-tolyl benzoyl peroxide, succinic acid peroxide, and the like.

Specific examples of the dialkyl peroxides include dicumylperoxide, 2,5-dimethyl-2,5-di(t-butylperoxy)hexane, 1,3-bis(t-butylperoxyisopropyl)hexane, t-butylcumylperoxide, di-t-butyl peroxide, di-t-hexylperoxide, 2,5-dimethyl-2,5-di(t-butylperoxy)hexin-3, and the like.

Specific examples of the peroxyketals include 1,1-di-t-hexylperoxy-3,3,5-trimethylcyclohexane, 1,1-di-t-hexylperoxycyclohexane, 1,1-di-t-butylperoxy-2-methylcyclohexane, 1,1-di-t-butylperoxycyclohexane, 2,2-di(t-butylperoxy)butane, 4,4-bis[(t-butyl)peroxy]pentanoate butyl, and the like.

Specific examples of the alkyl peresters (peroxyesters) include 1,1,3,3-tetramethylbutylperoxyneodecanoate, α-cumylperoxyneodecanoate, t-butylperoxyneodecanoate, t-hexylperoxyneodecanoate, t-butylperoxyneoheptanoate, t-hexylperoxypivalate, t-butylperoxypivalate, 1,1,3,3-tetramethylbutylperoxy-2-ethylhexanoate, t-amylperoxy-2-ethylhexanoate, t-butylperoxy-2-ethylhexanoate, t-butylperoxyisobutylate, di-t-butylperoxyhexahydroterephthalate, 1,1,3,3-tetramethylbutylperoxy-3,5,5-trimethylhexanoate, t-amylperoxy-3,5,5-trimethylhexanoate, t-butylperoxy-3,5,5-trimethylhexanoate, t-butylperoxyacetate, t-butylperoxybenzoate, dibutylperoxytrimethyladipate, 2,5-dimethyl-2,5-di-2-ethylhexanoylperoxyhexane, t-hexylperoxy-2-ethylhexanoate, t-hexylperoxyisopropylmonocarbonate, t-butylperoxylaurate, t-butylperoxyisopropylmonocarbonate, t-butylperoxy-2-ethylhexylmonocarbonate, 2,5-dimethyl-2,5-dibenzoylperoxyhexane, and the like.

Specific examples of the peroxycarbonates include di-n-propylperoxydicarbonate, di-isopropylperoxycarbonate, di-4-t-butylcyclohexylperoxycarbonate, di-2-ethylhexylperoxycarbonate, di-sec-butylperoxycarbonate, di-3-methoxybutylperoxydicarbonate, di-2-ethylhexylperoxydicarbonate, di-isopropyloxydicarbonate, t-amyloxyperoxyisopropylcarbonate, t-butylperoxyisopropylcarbonate, t-butylperoxy-2-ethylhexylcarbonate, 1,6-bis(t-butylperoxycarboxyloxy)hexane, and the like.

As the component (B), a thermal polymerization initiator having a half-life temperature of 10 hours of 30 to 110° C. is preferred from the viewpoint of heat resistance of an insert object.

Specifically, among the above compounds, diacyl peroxides, peroxycarbonates, peroxyesters, and peroxyketals are preferred.

From the viewpoint of moldability, a compound represented by the following formula B1 to a compound represented by the following formula B3 are more preferred.

B1

B2

B3

The component (B) may be used alone or in combination of two or more.

Based on 100 parts by mass of the component (A) (based on 100 parts by mass of the total of the component (A) and the component (C) when the component (C) described later is contained), the content of the component (B) is preferably 0.01 to 10 parts by mass, more preferably 0.1 to 5 parts by mass, and still more preferably 0.1 to 3 parts by mass.

When the content is within the above range, a molded article in which an uncured portion is reduced can be obtained.

From the viewpoint of moldability, electrical characteristics of the cured product, heat resistance of the cured product, oil resistance of the cured product, and gas permeability of the cured product, it is preferable that the thermosetting composition of the invention further contain (C) an acrylate compound or a methacrylate compound.

The component (C) preferably contains an acrylate compound or a methacrylate compound in which an aliphatic hydrocarbon group is ester-bonded, and particularly preferably contains an acrylate compound or a methacrylate compound having a substituted or unsubstituted alicyclic hydrocarbon group including 6 or more (preferably 6 to 30, more preferably 7 to 15) carbon atoms, in which an aliphatic hydrocarbon group is ester-bonded. Thus, the glass transition point of the cured product can be raised, and the heat resistance and light resistance of the obtained cured product can be improved. Further, it is possible to improve the fillability, thereby suppressing the deformation and disconnection of an insert object (e.g., an electronic circuit device, an electronic circuit board) due to the flow resistance.

The aliphatic hydrocarbon group is preferably an alkyl group, and more preferably a linear alkyl group including 8 or more carbon atoms (preferably including 8 to 24 carbon atoms, more preferably including 9 to 18 carbon atoms).

In an acrylate compound or a methacrylate compound in which an aliphatic hydrocarbon group is ester-bonded, two or more (preferably two) of (meth)acrylate groups may be contained.

When the number of (meth)acrylate groups is two, the aliphatic hydrocarbon group is preferably an alkylene group, and more preferably a linear alkylene group including 8 or more carbon atoms (preferably including 8 to 24 carbon atoms, more preferably including 9 to 18 carbon atoms).

Specific examples of the alkyl group including 8 or more carbon atoms include a decyl group, a dodecyl group (including a lauryl group), a tridecyl group, a tetradecyl group, a hexadecyl group, an octadecyl group (including a stearyl group), an eicosyl group, a triacontyl group, a tetracontyl group, and the like. The alkyl group and the alkylene group including 8 or more carbon atoms may be an alkyl group and an alkylene group derived from a hydrogenated product of a polymer such as polybutadiene, polyisoprene, or the like. Specific examples of the alkylene group including 8 or more carbon atoms include a divalent residue obtained by removing a hydrogen atom from the above alkyl group.

Specific examples of the acrylate or methacrylate compound in which an aliphatic hydrocarbon group is ester-bonded include lauryl (meth)acrylate (e.g., 1-lauryl methacrylate), tridecyl (meth)acrylate, tetradecyl (meth)acrylate, hexadecyl (meth)acrylate, stearyl (meth)acrylate, eicosyl (meth)acrylate, triacontyl (meth)acrylate, tetracontyl (meth) acrylate, and the like.

Further, examples thereof include an acrylic compound or a methacrylic compound having a hydrogenated polybutadiene skeleton such as hydrogenated polybutadiene di(meth) acrylate, an acrylic compound or a methacrylic compound having a hydrogenated polyisoprene skeleton such as hydrogenated polyisoprene di(meth)acrylate, and 1,10-decanediol di(meth)acrylate.

From the viewpoint of heat resistance, the substituted or unsubstituted alicyclic hydrocarbon group including 6 or more ring carbon atoms is preferably one or more groups selected from the group consisting of a substituted or unsubstituted adamantyl group, a substituted or unsubstituted norbornyl group, a substituted or unsubstituted isobornyl group, and a substituted or unsubstituted dicyclopentanyl group.

As an acrylate compound or a methacrylate compound in which a substituted or unsubstituted alicyclic hydrocarbon group including 6 or more ring carbon atoms is ester-bonded, a compound represented by the following formulas (I) to (IV) is preferred.

In the formulas (I), (II), (III), and (IV), $R^1$'s independently represent a hydrogen atom or a methyl group.

X's independently represent a single bond, an alkylene group including 1 to 4 (preferably 1 or 2) carbon atoms, or an oxyalkylene group including 1 to 4 (preferably 1 or 2) carbon atoms, and a single bond is preferable.

U's independently represent a hydrogen atom, an alkyl group including 1 to 4 (preferably 1 or 2) carbon atoms, a halogen atom, a hydroxyl group, or a =O group. k represents an integer of 1 to 15. l represents an integer of 1 to 8. m represents an integer of 1 to 11. n represents an integer of 1 to 15.

When two or more U's are present, the two or more U's may be the same as or different from each other.

Examples of the alkylene group including 1 to 4 carbon atoms of X include, for example, a methylene group, an ethylene group, a trimethylene group, a propylene group, a tetramethylene group, a butylene group, a 2-methyltrimethylene group, and the like.

Examples of the oxyalkylene group including 1 to 4 carbon atoms of X include, for example, an oxymethylene group, an oxyethylene group, an oxypropylene group, an oxybutylene group, and the like.

The =O group of U is a double bond group of an oxygen atom, and can be bonded by removing two hydrogen atoms from a carbon atom capable of removing two hydrogen atoms from the same carbon atom in an alicyclic hydrocarbon group of a compound represented by the formulas (I) to (IV).

Examples of the alkyl group including 1 to 4 carbon atoms of U include a methyl group, an ethyl group, a propyl group (e.g., an n-propyl group, an isopropyl group), a butyl group (e.g., an n-butyl group, an isobutyl group), and the like.

Examples of the halogen atom of U include a fluorine atom, a bromine atom, an iodine atom, or the like.

From the viewpoint of heat resistance, X is preferably a single bond.

As an acrylate compound or a methacrylate compound in which a substituted or unsubstituted alicyclic hydrocarbon group including 6 or more ring carbon atoms is ester-bonded, adamantyl methacrylate, cyclohexyl methacrylate, 1-norbomyl methacrylate, 1-isobornyl methacrylate, or 1-dicyclopentanyl methacrylate is mroe preferable, and 1-adamantyl methacrylate, 1-norbomyl methacrylate, 1-isobornyl methacrylate is still more preferable.

In this specification, examples of the substituent in the case of "substituted or unsubstituted" (hereinafter, also referred to as an arbitrary substituent) include an alkyl group including 1 to 6 carbon atoms, an alkoxy group including 1 to 6 carbon atoms, a halogen atom, a hydroxyl group, and the like.

Examples of the (preferably linear or branched) alkyl group including 1 to 6 carbon atoms include a methyl group, an ethyl group, a propyl group (e.g., an n-propyl group, an isopropyl group), a butyl group (e.g., an n-butyl group, an isobutyl group, an s-butyl group, a t-butyl group), a pentyl group (e.g., an n-pentyl group), a hexyl group, and the like.

Examples of the alkoxy group including 1 to 6 carbon atoms include a methoxy group, an ethoxy group, a propoxy group, a butoxy group, a pentyloxy group, a hexyloxy group, and the like.

Examples of the halogen atom include a fluorine atom, a bromine atom, an iodine atom, or the like.

From the viewpoint of improving adhesiveness and wettability, the component (C) may contain acrylic acid, methacrylic acid, or a monofunctional acrylate compound or methacrylate compound having a polar group (other than an acrylate compound or a methacrylate compound in which a substituted or unsubstituted alicyclic hydrocarbon group including 6 or more ring carbon atoms is ester-bonded).

Examples of the polar group include a hydroxy group, an epoxy group, a glycidyl ether group, a tetrahydrofurfuryl group, an isocyanate group, a carboxyl group, an alkoxysilyl group, a phosphate ester group, a lactone group, an oxetane group, a tetrahydropyranyl group, an amino group, and the like.

Specific examples of the monofunctional (meth)acrylate compound having a polar group include 2-hydroxylethyl (metha)acrylate, 2-hydroxylpropyl(metha)acrylate, 2-hydroxylbutyl(metha)acrylate, 4-hydroxylbutyl(metha)acrylate (for exmaple, trade name: 4-HBA, manufactured by Nihon Kasei Co., Ltd.), cyclohexanedimethanol mono (meth)acrylate (for example, trade name: CHMMA, manufactured by Nihon Kasei Co., Ltd.), glycidyl(metha)acrylate, and 4-hydroxybutylacrylate glycidyl ether (for example, trade name: 4-HBAGE, manufactured by Nihon Kasei Co., Ltd.), tetrahydrofurfuryl(meth)acrylate, 2-isocyanatoethyl (meth)acrylate, 2-(meth)acryloyloxyethyl succinate, 2-(meth)acryloyloxyethyl hexahydrophthalate, 3-(meth) acryloxypropyltrimethoxysilane, 3-(meth)acryloxypropylmethyldimethoxysilane, 3-(meth)acryloxypropyltriethoxysilane, 3-(meth)acryloxypropylmethyldiethoxysilane, 2-(meth)acryloyloxyethyl phosphate, bis(2-(meth)acryloyloxyethyl)phosphate, KAYAMER PM-2 (trade name, manufactured by Nippon Kayaku Co., Ltd.), KAYAMER PM-21 (trade name, manufactured by Nippon Kayaku Co., Ltd.), γ-butyllactone(meth)acrylic acid, (meth)acrylic acid (3-methyl-3-oxetanyl), (meth)acrylic acid (3-ethyl-3-oxetanyl), tetrahydrofurfuryl(meth)acrylate, dimethylaminoethyl (meth)acrylate, diethylaminoethyl(meth)acrylate, and the like.

From the viewpoint of adhesiveness to the substrate, the component (C) preferably contains an acrylate compound or a methacrylate compound, which has a glycidyl group.

From the viewpoint of adjusting the viscosity, adjusting the hardness of the cured product, and suppressing cracking and the like, the component (C) may contain a monofunctional acrylate compound or a monofunctional methacrylate compound other than the above.

Examples of the monofunctional acrylate compound or the monofunctional methacrylate compound other than the above of the component (C) include ethyl(meth)acrylate, n-butyl(meth)acrylate, isobutyl(meth)acrylate, t-butyl(meth) acrylate, 2-ethylhexylmethacrylate, isodecyl(meth)acrylate, methyl(meth)acrylate, butoxyethylene glycol (meth)acrylate, methoxydiethylene glycol (meth)acrylate, butoxypolyethylene glycol (meth)acrylate, methoxypolyethylene glycol (meth)acrylate, urethane (meth)acrylate, and the like.

From the viewpoint of suppressing discoloration to yellow or the like during heat curing, it is preferable that the monofunctional acrylate compound or the monofunctional methacrylate compound other than the above of the component (C) do not contain an aliphatic urethane structure (e.g., —NH—C(=O)—O—).

From the viewpoint of mechanical strength and curing rate, the component (C) may contain a polyfunctional acrylate compound or a polyfunctional methacrylate compound (preferably containing two to five functional groups) within a range not inhibiting the effect of the invention.

The polyfunctional acrylate compound or the polyfunctional methacrylate compound of the component (C) include tricyclodecanedimethanol di(meta)acrylate, 1,10-decanediol di(meta)acrylate, 1,9-nonanediol di(meta)acrylate, trimethylolpropane tri(meta)acrylate, dipropylene glycol di(meta) acrylate, alkoxidized hexanediol di(meta)acrylate, alkoxidized aliphatic di(meta)acrylate, polyethylene glycol di(meta)acrylate, tetraethylene glycol di(meta)acrylate, tripropylene glycol di(meta)acrylate, and the like.

From the viewpoint of heat resistance, it is preferable that the polyfunctional acrylate compound or the polyfunctional methacrylate compound of the component (C) do not contain an aliphatic urethane structure (e.g., —NH—C(=O)—O—).

The component (C) may be used alone or in combination of two or more.

When the component (C) is contained, the content of the component (C) is preferably from 1 to 70% by mass, more preferably from 10 to 50% by mass, based on 100% by mass of the total of the component (A) and the component (C).

When the content is within the above range, the moldability can be maintained and the gas barrier property and the heat resistance can be improved.

The thermosetting composition of the invention may further contain an additive within a range not inhibiting the effect of the invention. Examples of the additive include an antioxidant, a light stabilizer, a flame retardant, an ultraviolet absorber, a plasticizer, an inorganic filler, a colorant, an antistatic agent, a lubricant, a mold release agent, a leveling agent, a defoaming agent, and the like. Known additives can be used.

Examples of the antioxidant include a phenol-based antioxidant, a phosphorus-based antioxidant, a sulfur-based antioxidant, a vitamin-based antioxidant, a lactone-based antioxidant, an amine-based antioxidant, and the like.

Examples of the phenol-based antioxidant include tetrakis [methylene-3-(3,5-di-t-butyl-4-hydroxyphenyl)propionate] methane, β-(3,5-di-t-butyl-4-hydroxyphenyl)propionate stearyl ester, 1,3,5-trimethyl-2,4,6-tris(3,5-di-t-butyl-4-hydroxybenzyl)benzene, tris(3,5-di-t-butyl-4-hydroxybenzyl) isocyanurate, tris[(3,5-di-t-butyl-4-hydroxyphenyl)propionyloxyethyl]isocyanurate, 2,6-di-t-butyl-4-methylphenol, 3,9-bis[1,1-dimethyl-2-{β-(3-t-butyl-4-hydroxy-5-methylphenyl)propionyloxy}ethyl]-2,4,8,10-tetraoxaspiro[5,5] undecane, 3,9-bis[2-[3-(3-tert-butyl-4-hydroxy-5-methylphenyl)-propionyloxy]-1,1-dimethylethyl]-2,4,8,10-tetraoxapyro[5.5]undecane, tris(2,6-dimethyl-3-hydroxy-4-t-butylbenzyl)isocyanurate and the like. Commercial products such as IRGANOX 1010, IRGANOX 1076, IRGANOX 1330, IRGANOX 3114, IRGANOX 3125, IRGANOX 3790 (the above are manufactured by BASF SE), CYANOX 1790 (manufactured by Cyanamid Company), and SUMILIZER BHT, SUMILIZER GA-80 (the above are manufactured by Sumitomo Chemical Company, Limited) can be used (all are trade names).

Examples of the phosphorus-based antioxidant include tris(2,4-di-t-butylphenyl)phosphite, 2-[[2,4,8,10-tetrakis(1,1-dimethylethyl)dibenzo[d,f][1,3,2]dioxaphosphepin-6-yl]oxy]-N,N-bis[2-[[2,4,8,10-tetrakis(1,1-dimethylethyl)dibenzo[d,f][1,3,2]dioxaphophin-6-yl]oxy]ethyl]ethanamine, cyclic neopentanetetraylbis(2,6-di-t-butyl-4-methylphenyl)phosphite, distearyl pentaerythritol diphosphite, and the like. Commercial products such as IRGAFOS 168, IRGAFOS 12, IRGAFOS 38 (the aboves are manufactured by BASF SE), ADK STAB 329K, ADK STAB PEP36, ADK STAB PEP-8 (manufactured by ADEKA CORPORATION), Sandstab P-EPQ (manufactured by Clariant AG), and Weston 618, Weston 619G, Weston 624 (the aboves are manufactured by General Electric Company) can be used (all are trade names).

Examples of the sulfur-based antioxidant include dilaurylthiodipropionate, distearylthiodipropionate, dimyristylthiodipropionate, laurylstearylthiodipropionate, pentaerythritol tetrakis(3-dodecylthiopropionate), pentaerythritol tetrakis(3-laurylthiopropionate), and the like. Commercial products such as DSTP "yoshitomi", DLTP "yoshitomi", DLTOIB, DMTP "yoshitomi" (the aboves are manufactured by API Corporation), Seenox 412S (manufactured by SHIPRO KASEI KAISHA, LTD.), Cyanox 1212 (manufactured by Cyanamid Company), and SUMILIZER TP-D (manufactured by Sumitomo Chemical Company, Limited) can be used (all are trade names).

Examples of the vitamin-based antioxidant include tocopherol, 2,5,7,8-tetramethyl-2-(4',8',12'-trimethyltridecyl)coumaron-6-ol and the like. Commercial products such as IRGANOX E201 (manufactured by BASF SE) can be used.

Examples of the lactone-based antioxidant include those described in JPH07-233160 and JPH07-247278 can be used. Further, HP-136 (trade name, manufactured by BASF SE, compound name: 5,7-di-t-butyl-3-(3,4-dimethylphenyl)-3H-benzofuran-2-one) and the like can be used.

Examples of the amine-based antioxidant include commercial products such as IRGASTAB FS 042 (manufactured by BASF SE), GENOX EP (manufactured by Crompton Corporation, compound name: dialkyl-N-methylamineoxide) can be used (all are trade names).

The antioxidant may be used alone or in combination of two or more.

When the antioxidant is contained, the content of the antioxidant is based on 100 parts by mass of the component (A) (based on 100 parts by mass of the total of the component (A) and the component (C) when the component (C) is contained), preferably 0.001 to 20 parts by mass, from the viewpoint of not inhibiting the effect of the invention.

As the light stabilizer, any one such as an ultraviolet absorber or a hindered amine light stabilizer can be used, and is preferably a hindered amine light stabilizer.

Specific examples of the hindered amine-based light stabilizer include ADK STAB LA-52, LA-57, LA-62, LA-63, LA-67, LA-68, LA-77, LA-82, LA-87, LA-94 (manufactured by ADEKA Corporation), Tinuvin 123, 144, 440, 662, 765, 770DF, Tinuvin XT 850 FF, Tinuvin XT 855 FF, Chimassorb 2020, 119, 944 (the above are manufactured by BASF SE), Hostavin N30 (manufactured by Hoechst AG), Cyasorb UV-3346, UV-3526 (CYTEC INDUSTRIES INC.), Uval 299 (manufactured by GLC), and Sanduvor PR-31 (manufactured by Clariant AG) can be used (all are trade names).

Specific examples of the ultraviolet absorber include Adecastab LA-31, Adecastab LA-32, Adecastab LA-36, Adecastab LA-29, Adecastab LA-46, Adecastab LA-F70, Adecastab 1413 (the aboves are manufactured by ADEKA Corporation), and Tinuvin P, Tinuvin 234, Tinuvin 326, Tinuvin 328, Tinuvin 329, Tinuvin 213, Tinuvin 571, Tinuvin 765, Tinuvin 1577ED, Chimassorb 81, Tinuvin 120 (the above are manufactured by BASF SE) can be used (all are trade names). Among these, Tinuvin series manufactured by BASF SE is preferred, and Tinuvin 765 is more preferred.

The light stabilizer may be used alone or in combination of two or more.

When the light stabilizer is contained, the content of the light stabilizer is based on 100 parts by mass of the component (A) (based on 100 parts by mass of the total of the component (A) and the component (C) when the component (C) is contained), preferably 0.001 to 20 parts by mass, from the viewpoint of not inhibiting the effect of the invention.

Examples of the flame retardant include,
a phosphorus-based flame retardant;
a halogen-based flame retardant;
a nitrogen-based compound;
a metal hydroxide;
a silicone-based flame retardant;
an organic alkali metal salt;
an organic alkaline earth metal salt; and the like.

Examples of the phosphorus-based flame retardant include a phosphorus-based flame retardant containing no halogen.

Examples of the phosphorus-based flame retardant containing no halogen include a halogen-free phosphorus-based flame retardant, a halogen-free organophosphorus-based flame retardant, and the like. Examples of the halogen-free organophosphorus-based flame retardant include a phosphate ester compound, a phosphate amine salt, and an ammonium polyphosphate, and the like, and a phosphate ester compound is preferred.

Examples of the halogen-free phosphorus-based flame retardant include red phosphorus and the like.

Specific examples of the phosphate ester compound include trimethyl phosphate, triethyl phosphate, tributyl phosphate, trioctyl phosphate, tri(butoxyethyl) phosphate, triphenyl phosphate, tricresyl phosphate, cresyl diphenyl phosphate, octyl diphenyl phosphate, tri(2-ethylhexyl) phosphate, diisopropylphenyl phosphate, trixylenyl phosphate, tris(isopropylphenyl) phosphate, trinaphthyl phosphate, bisphenol A bisdiphenyl phosphate, hydroquinone bisdiphenyl phosphate, resorcin bisdiphenyl phosphate, resorcinol-diphenyl phosphate, trioxybenzene triphosphate, cresyl diphenyl phosphate, and the like.

A substituted product of the above phosphoric ester compound and a fused product of the above phosphoric ester compound can also be used.

Examples of the commercial product of the phosphate ester compound include, for example, TPP [triphenyl phosphate], TXP [trixylenyl phosphate], CR-733S [resorcinol bis(diphenyl phosphate)], CR741 [phenol A bis(diphenyl phosphate)], PX200 [1,3-phenylene-tetrakis(2,6-dimethylphenyl)phosphate ester], PX201 [1,4-phenylene-tetrakis(2,6-dimethylphenyl)phosphate ester], PX202 [4,4'-biphenylene-tetrakis)2,6-dimethylphenyl)phosphate ester], manufactured by DAIHACHI CHEMICAL INDUSTRY CO., LTD., FP2010 manufactured by ADEKA CORPORATION, and the like.

Examples of the phosphate amine salt include an orthophosphate amine salt, a pyrophosphate salt, and a fused phosphate salt.

Examples of the phosphate of the phosphate amine salt include orthophosphoric acid ($H_3PO_4$), pyrophosphate, fused phosphate, and the like.

Examples of the amine of the phosphate amine salt include 1,2-diaminoethane, 1,3-diaminopropane, 1,4-diaminobutane, 1,5-diaminopentane, 1,6-diaminohexane, urea, N,N'-dimethylurea, thiourea, isocyanuric acid, ethylene urea, ethylene thiourea, hydantoin, hexahydropyrimidin-2-one, parabalic acid, valpitruic acid, ammeline, melon, melam, guanazole, guanidine, guanizine, ethyleneimine, pyrrolidine, 2-pyrrolidone, 3-pyrrolidone, piperidine, morpholine, thiomorpholine, α-piperidone, p-piperidone, γ-piperidone, piperazine, 4-methylpiperazine, 2-methylpiperazine, 2,5-dimethylpiperazine, 2,3,5,6-tetramethylpiperazine, 2-ethylpiperazine, 2,5-diethylpiperazine, melamine, guanamine, methylguanamine, ethylguanamine, benzoguanamine, benzylguanamine, dicyandiamide, 1,3-diaminobenzene, 1,4-diaminobenzene, 2,4-diaminotoluene, 2,4-diamino-6-morpholino-1,3,5-triazine, 2,4-diamino-6-thiomorpholino-1,3,5-triazine, and the like.

Here, the fused phosphate refers to a polyphosphate in which three or more molecules of phosphate are fused, and may be a fused product of triphosphate, tetraphosphate, or more phosphate, or a mixture thereof. Further, although the fused phosphate is mainly a linear structure, a branched structure and a cyclic structure may be contained.

Examples of the commercially available product of the phosphate amine salt include FP2050 (manufactured by ADEKA CORPORATION) and the like.

The polyphosphate of ammonium polyphosphate is the same as the fused phosphate described above.

Examples of the commercial product of the ammonium polyphosphate include AP-422 (manufactured by Clariant AG), TERRJU-S10 (manufactured by Chemische Fabrik Budenheim, TERRJU-S20 (manufactured by Chemische Fabrik Budenheim), and the like.

Since ammonium polyphosphate is susceptible to hydrolysis, ammonium polyphosphate having reduced hydrolysablity such as microencapsulated product of ammonium polyphosphate with a thermosetting resin, treated product such as coated product of ammonium polyphosphate with a melamine monomer or other nitrogen-containing organic compound, treated product of ammonium polyphosphate with a surfactant or a silicone compound, insolubilized product of ammonium polyphosphate by adding melamine or the like in the process of producing ammonium polyphosphate, and the like can also be used.

Examples of the commercial product of ammonium polyphosphate having reduced hydrolysablity described above include AP-462 (manufactured by Clariant AG), TERRJU-C30 (manufactured by Chemische Fabrik Budenheim), TERRJU-C60 (manufactured by Chemische Fabrik Budenheim), TERRJU-C70 (manufactured by Chemische Fabrik Budenheim), TERRJU-C80 (manufactured by Chemische Fabrik Budenheim), and the like.

Examples of the flame retardant include a halogen-based flame retardant from the viewpoint of improving flame retardancy.

Examples of the halogen-based flame retardant include 2,4,6-tris(2,4,6-tribromophenoxy)-1,3,5-triazine, a brominated epoxy oligomer, ethylene bis(pentabromophenyl), ethylene bis(tetrabromophthalimide), decabromodiphenyl ether, tetrabromobisphenol A, halogenated polycarbonate, a halogenated polycarbonate (co)polymer, an oligomer of halogenated polycarbonate or halogenated polycarbonate (co)polymer, halogenated polystyrene, halogenated polyolefin, and the like.

Further, examples of the halogen-based flame retardant include a bromine-based flame retardant and the like.

From the viewpoint of improving flame retardancy, the flame retardant preferably contains a bromine-based flame retardant.

Examples of the bromine-based flame retardant include tris(tribromoneopentyl) phosphate, tris-dibromopropylisocyanurate, and the like.

From the viewpoint of improving flame retardancy, it is preferable that the flame retardant contain tris(tribromoneopentyl) phosphate.

In the case of halogen-free application, it is preferable to select a flame retardant other than a halogen-based flame retardant (e.g., a bromine-based flame retardant).

Examples of the nitrogen-based compound include melamine, a melamine substituted by an alkyl group or aromatic group, and the like.

Examples of the metal hydroxide include aluminium hydroxide, magnesium hydroxide, calcium hydroxide, barium hydroxide, zirconium hydroxide, basic magnesium carbonate ($mMgCO_3 \cdot Mg(OH)_2 \cdot nH_2O$ (e.g., m=3 to 5, n=3 to 7)), dolomite, zinc hydroxystannate, tin oxide hydrate, and borax ($Na_2B_4O_5(OH)_4 \cdot 8H_2O$).

Examples of the silicone-based flame retardant include silicone oil, silicone resin, and the like, and more specifically, a silicone-based compound having a specific structure containing a reactive group such as an alkoxy group or an epoxy group, a silicone resin having a specific molecular weight different in the amount of oxygen in the repeating unit, and the like (see JPH06-306265A, JPH06-336547A, JPH08-176425A, JPH10-139964A, and the like).

As the silicone-based flame retardant, a silicone compound containing a functional group, for example, (poly)organosiloxane having a functional group is preferred.

The silicone-based flame retardant is usually in the form of a liquid or a powder or the like, and a form having good dispersibility in melt-kneading is preferable. Examples include a liquid having a viscosity of about 10 to 500,000 cst (centistokes) at room temperature.

When the silicone-based flame retardant is a silicone compound containing a functional group, even in a liquid state, it is possible to uniformly disperse in the flame-retardant resin composition and to reduce bleeding at the time of molding or on the surface of the molded body.

Examples of the organic alkali metal salt and the organic alkaline earth metal salt include an alkali metal salt or an alkaline earth metal salt of an organic acid.

Examples of the organic acid include an organic sulfonic acid (e.g., methanesulfonic acid), an organic carboxylic acid, and the like. Examples of the alkali metal include sodium, potassium, lithium, cesium, and the like, and examples of the alkaline earth metal include magnesium, calcium, strontium, barium, and the like.

The organic alkali metal salt and the organic alkaline earth metal salt are preferably a salt of sodium, a salt of potassium, or a salt of cesium. The organic acid may be substituted with a halogen such as fluorine, chlorine, bromine, or the like.

Among the above organic alkali metal salt and organic alkaline earth metal salt, an alkali metal salt of perfluoroalkanesulfonic acid or an alkaline earth metal salt of perfluoroalkanesulfonic acid is preferred.

Examples of the perfluoroalkanesulfonic acid include perfluoromethanesulfonic acid, perfluoroethanesulfonic acid, perfluoropropanesulfonic acid, perfluorobutanesulfonic acid, perfluoromethylbutanesulfonic acid, perfluorohexanesulfonic acid, perfluoroheptanesulfonic acid, perfluorooctanesulfonic acid, and the like.

In particular, potassium salts of these are preferably used.

Examples of the organic sulfonic acid include 2,5-dichlorobenzenesulfonic acid; 2,4,5-trichlorobenzenesulfonic acid; diphenylsulfone-3-sulfonic acid; diphenylsulfone-3,3'-disulfonic acid; naphthalene trisulfonic acid, and the like, in addition to the above perfluoroalkanesulfonic acid.

An alkali metal salt or an alkaline earth salt of a resin (e.g., a thermoplastic resin) in which a sulfonic acid or the like is substituted for an aromatic ring of an aromatic vinyl-based resin can also be used as a flame retardant.

Examples of the aromatic vinyl-based resin include a thermoplastic resin having a styrene structure such as polystyrene, rubber-modified polystyrene, styrene-acrylonitrile copolymer, and ABS resin (acetylene-butadiene-styrene copolymer), and among these, polystyrene is preferably used.

Examples of the organic carboxylic acid include perfluoroformic acid, perfluoromethanecarboxylic acid, perfluoroethanecarboxylic acid, perfluoropropanecarboxylic acid, perfluorobutanecarboxylic acid, perfluoromethylbutanecarboxylic acid, perfluorohexanecarboxylic acid, perfluoroheptanecarboxylic acid, perfluorooctanecarboxylic acid, and the like.

In addition, examples of the flame retardant include borate compounds such as zinc borate, zinc metaborate, barium metaborate, aluminum borate, sodium polyborate;

silicon compounds such as silica (silicon dioxide), synthetic amorphous silica (silicon dioxide), aluminum silicate, magnesium silicate, calcium silicate, zirconium silicate, diatom earth;

metal oxides such as aluminum oxide, magnesium oxide, barium oxide, titanium oxide, zinc oxide, tin oxide, zirconium oxide, molybdenum oxide, zirconium-antimony composite oxide;

expandable graphite; and the like.

As the expandable graphite, the degree of swelling at 300° C. is 185 cc/g or more, and from the viewpoint of suppressing the occurrence of cracks, the expandable graphite having a particle diameter of 22 mesh on of 5% or less is preferable.

The flame retardant may be used alone or in combination of two or more.

When a flame retardant is contained, the content of the flame retardant is 0.001 to 20 parts by mass based on 100 parts by mass of the component (A) (based on 100 parts by mass of the total of the component (A) and the component (C) when the component (C) is contained).

As a result, flame retardancy can be improved.

Examples of the release agent include an internal release agent and the like.

The internal release agent is not particularly limited, and an aliphatic compound is preferable.

The aliphatic compound used as the internal release agent preferably has a melting point in the range of −40° C. to 180° C., and more preferably in the range of −30° C. to 180° C. By setting the melting point of the aliphatic compound to −40° C. or higher, the aliphatic compound does not vaporize during curing to generate bubbles or the like in the product, causing no appearance defect, and exhibits good mold releasability. Further, by setting the melting point of the aliphatic compound to 180° C. or lower, solubility of the aliphatic compound is improved to obtain good appearance and releasability.

Examples of the release agent include magnesium stearate and zinc stearate.

The release agent may be used alone or in combination of two or more.

When a release agent is contained, the content of the release agent is 0.001 to 20 parts by mass based on 100 parts by mass of the component (A) (based on 100 parts by mass of the total of the component (A) and the component (C) when the component (C) is contained).

By setting the content within the above range, the transfer property of the mold shape and the shape stability against heat can be maintained, and the releasability can be satisfactorily exhibited.

The thermosetting composition of the invention essentially consists of a component (A) and a component (B), and optionally a component (C) and an additive, and may contain other unavoidable impurities within a range not impairing the effect of the invention.

For example, 40% by mass or more, 95% by mass or more, 99% by mass or more, or 100% by mass of the thermosetting composition of the invention may consist of:

a component (A) and a component (B), a component (A) to a component (C), a component (A) and a component (B), and optionally a component (C) and an additive, or a component (A) to a component (C) and optionally an additive.

The thermosetting composition of the invention can be prepared by mixing each of the above components in a predetermined amount ratio. The method for mixing is not particularly limited, and any known methods such as an agitator (mixer) can be used. The mixing can be performed at ambient temperature, cooling, or heating, at ambient pressure, under reduced pressure, or under increased pressure.

The method for manufacturing a molded article contains a step of supplying the thermosetting composition into a plunger (supplying step); filling the supplied thermosetting composition into a molding part of a mold having a molding part (cavity) by the plunger (filling step); and thermosetting the filled thermosetting composition in the molding part (curing step).

In the method of manufacturing a molded article of the invention, a step of extruding the thermosetting resin obtained by thermosetting (release step) may be contained.

In the method of the invention, transfer molding such as LTM (Liquid Transfer Molding) molding, compression molding, or injection molding such as LIM (Liquid Injection Molding) molding are preferable from the viewpoint of preventing only the resin components from being filled. Pre-polymerization may be performed.

By using the above-described thermosetting composition, when the inside of the mold is filled with the thermosetting composition by applying a pressure, or when the holding pressure after filling is excessively applied, the thermosetting composition can be filled even in a gap of 1 μm.

In a transfer molding, a transfer molding machine (e.g., a liquid transfer molding machine G-Line) can be used, for example, to mold with a clamping force of 5 to 20 kN and at a molding temperature of 60 to 190° C. for a molding time of 30 to 500 seconds, and preferably at a molding temperature of 70 to 180° C. for a molding time of 30 to 180 seconds.

Post-curing may be performed, for example, at 150 to 185° C. for 0.5 to 24 hours.

In a liquid injection molding, for example, a liquid thermosetting resin injection molding machine LA-40S can be used, for example, to mold with a clamping force of 10 kN to 40 kN and at a molding temperature molding temperature of 60 to 190° C. fora molding time of 30 to 500 seconds, preferably at a molding temperature of 70 to 180° C. for a molding time of 20 to 180 seconds.

The molding machine described above preferably contains a plunger and a mold having and a molding part. The molding machine described above preferably further contains a shut-off nozzle.

Figure 1:
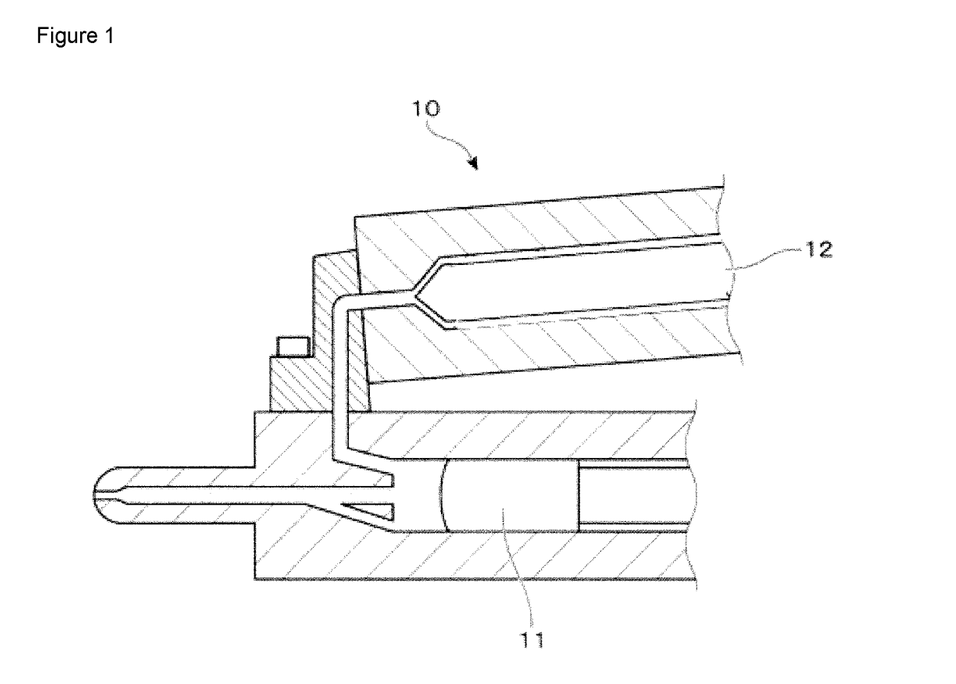
FIG. 1 is a schematic cross-sectional view of a filling device of the molding machine that can be used in the method of manufacturing the molded article of the invention.

FIG. 1 shows an embodiment of a filling device of a molding machine in which the method for injection molding of the invention can be performed in the method of manufacturing a molded article of the invention.

The molding machine of FIG. 1 is an injection molding machine having a plunger mechanism for extruding the thermosetting composition of the invention into a mold, wherein the injection molding machine has a filling device 10 having a plunger 11 shown in FIG. 1; a mold 20 having a cavity 21 shown in FIG. 2(A); and although not shown in the Figures, the machine has a pressure reducing device as a degassing device connected to pores for degassing the cavity 21 in the mold 20; a heating device as a heating means connected to the mold 20; and a cooling device. The molding material is a thermosetting composition of the invention.

As the filling device 10, a well-known filling device having a plunger can be used. Usually, the filling device 10 having the plunger 11 is provided with a feed part and a backflow prevention function as shown in FIG. 1, and the backflow prevention valve 12 (the backflow prevention valve may be a screw-shaped) is moved back and forth to feed, stir, and mix the material introduced from a slot not shown, but in the embodiment, the thermosetting composition, which is a homogeneous liquid, is fed in and therefore does not need to be stirred and mixed.

By means of a plunger, in the step of filling the cavity, it is preferable that the thermosetting composition be filled into the cavity in the mold via a flow path which is temperature-controlled to 50° C. or lower. When the method for molding of the invention is performed using the device shown in FIG. 2, the flow path corresponds to the flow path (not shown) of the thermosetting composition in the filling device 10 and the introduction path in the mold 20.

In the method of the invention, a gating system for blocking the flow of curing liquid and the transfer of heat to and from the flow channel (flow path) portion between the plunger and the cavity in the step of filling the cavity in the mold with the thermosetting composition filled in the plunger by the plunger is preferably provided. Hereinafter, a method for molding of the invention will be described with reference to FIG. 2.

Figure 2:
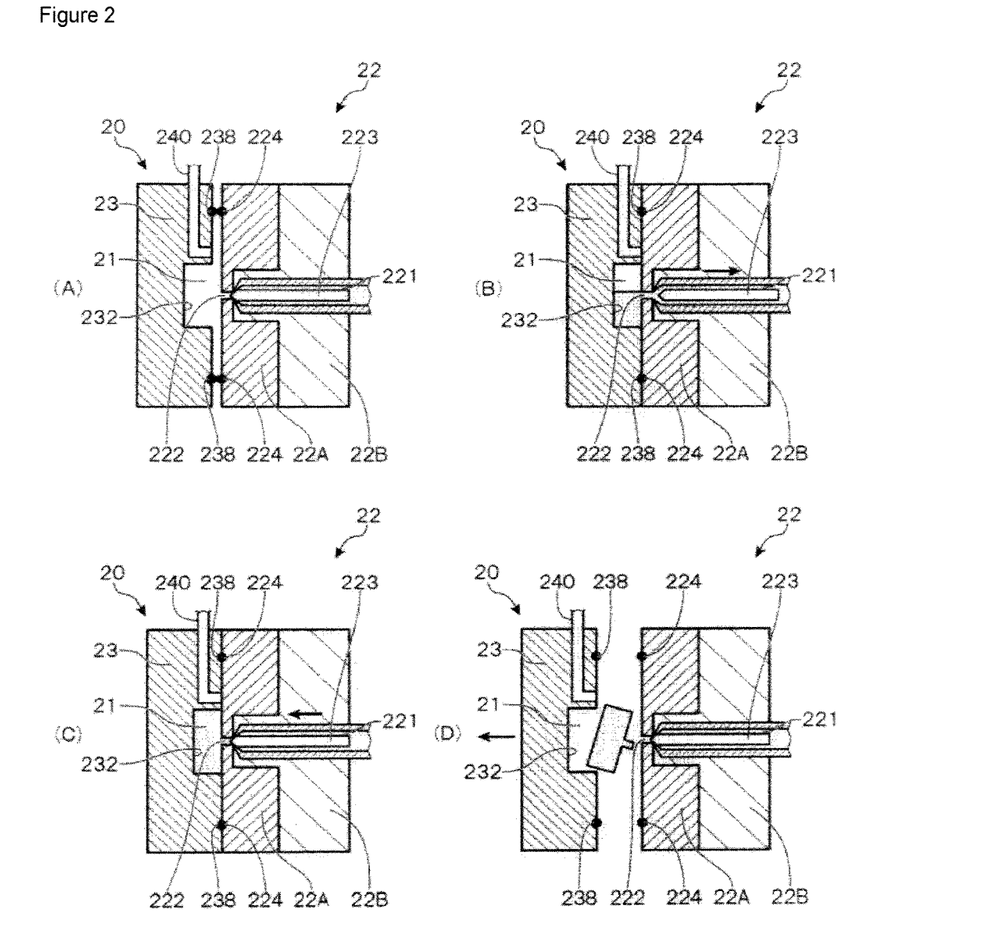
FIG. 2 is a schematic cross-sectional view of a mold that can be used in the method of manufacturing a molded article of the invention.

When the method of the invention is performed using the device shown in FIG. 2, for example, the needle 223 and the opening 222 correspond to the gating system. As described above, the needle 223 moves toward the movable mold 23, and the opening 222 is closed, whereby the introducing path 221 is cut off in front of the heating part 22A, and the thermosetting composition introduced into the introducing path 221 remains in the cooling part 22B, and the flow of the thermosetting composition and the transfer of heat can be blocked. Examples of the system which can block the flow of the thermosetting composition and the transfer of heat include a valve gate system and a blocking nozzle system, etc.

The heating device is a device for heating the heating part 22A and the movable mold 23. By heating these components, the temperature in the cavity (also referred to as "cavity temperature") can be a predetermined temperature. In the method of the invention, the temperature of the mold 232 constituting the cavity part is preferably set to a temperature of 50° C. or higher and 150° C. or lower.

The cooling device is a device for cooling the flow path of the thermosetting composition. Specifically, it is preferable to cool the filling device 10 and the cooling part 22B of the mold 20 to 10° C. or higher and 50° C. or lover.

In the case of injection molding, the needle of FIG. 1 (not shown) and the needle 223 of FIG. 2 corresponds, and the flow path of FIG. 1 (not shown) and the introducing path 221 of FIG. 2 corresponds.

FIG. 1 shows the supplying step.

In the case of transfer molding or compression molding, the weighing can be performed by inserting an appropriate amount of the raw material into the plunger 11 using a feeding device such as a syringe (not shown).

In the case of injection molding, the thermosetting composition is injected into the filling device 10 shown in FIG. 1 through an inlet not shown. The introduced thermosetting composition is extruded by the backflow prevention valve 12, and then a predetermined amount is weighed in a plunger 11. After weighing is completed or before injection, the backflow prevention valve 12 is advanced, and functions as a backflow valve when the plunger 11 is operated. During this time, since the flow path is cooled by the cooling device, the thermosetting composition flows smoothly without curing.

The filling step is shown, for example, in FIG. 2(B).

When the thermosetting composition is injected into the cavity, it is preferred to vent the air in the cavity or to depressurize the cavity with pores connected to a depressuring device, such as the depressuring tube 240 of FIG. 2, which enables the pressure in the cavity to be reduced. The reason is that in the step of injecting the thermosetting composition and completely filling the cavity, the vent allows the air in the cavity to escape, and the vacuum in the cavity allows the thermosetting composition to be completely filled by leaving the cavity free of air. In the absence of this mechanism, it may be preferable to have a mechanism that allows air in the cavity to escape when the raw material is filled (e.g., a vent mechanism).

To mold the thermosetting composition, first, the movable mold 23 is brought close to the fixed mold 22 and clamped (FIG. 2(A)). The elastic member 238 of the movable mold 23 stops moving the movable mold 23 once with a position that abuts the elastic member 224 of the fixed mold 22.

The filling of the cavity with the thermosetting composition is preferably performed by opening the gate of the gating system (moving the needle 223 towards the fixed mold 22) and filling the cavity 21 in the mold with the thermosetting composition. The heater part 22A provided in the movable mold 23 and the fixed mold 22 is constantly heated, and the cavity temperature is set to be, for example, 50° C. or higher, preferably 50° C. or higher and 150° C. or lower, particularly preferably 50° C. or higher and 120° C. or lower.

When an injection molding machine is used, the nozzle of the shut-off nozzle (in some cases, the valve gate) is opened to move the plunger of the injection part and the thermosetting component is injected into the cavity when starting injection from the injection part to the cavity. When a transfer molding machine is used, it is only necessary to allow the raw material to flow into the cavity in order to cure all the components from the inside of the plunger to the cavity, and it is not necessary to block the transfer of heat.

The curing step is shown, for example, in FIG. 2(C).

When filling of the thermosetting composition into the cavity 21 is completed, curing of the thermosetting composition is simultaneously started. In order to improve transferability of the molded article, curing is preferably performed by applying a predetermined pressure. That is, it is preferable that the plunger 11 be in a state of being pressurized to 1.0 MPa or more and 30 MPa or less. The pressure applied to the thermosetting composition in order to improve transferability is referred to as a holding pressure.

In the curing step, preferably, the holding pressure (increasing the pressure applied to the thermosetting composition) is performed after the start of thermosetting and before the completion of curing, and after the holding pressure, the gate of the gating system is closed to perform thermosetting. Specifically, the gate is closed by advancing the needle 223 to close the opening 222. In the molding step, the cooling device is activated to cool the entire flow path of the thermosetting composition, i.e., the cooling part 22B provided in the filling device 10 and the fixed mold 22 of the mold 20 of the molding machine. At this time, the entire flow path is preferably maintained at 10° C. or more, 50° C. or less, particularly preferably set to 30° C. or less.

Figure 3:
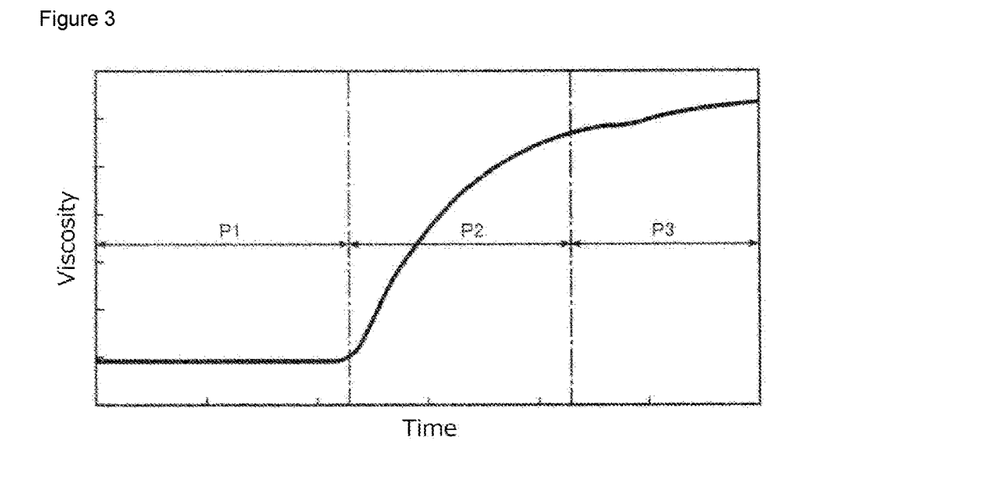
FIG. 3 is a diagram showing a relationship between viscosity and time of a thermosetting composition in one embodiment of the method of manufacturing a molded article of the invention.

Hereafter, the holding pressure of the plunger 11 and the timing of the start of the holding pressure will be described. FIG. 3 shows the relation between the viscosity of the thermosetting composition and time in the embodiment. In FIG. 3, the period P1 between injection of the raw material into the cavity and the completion of the filling corresponds to the induction phase until the raw material is heated and cured. The curing step is divided into two stages: an initial phase of curing P2, which is the period between when the material begins to cure with heat and when the raw material is cured, and the latter phase of curing P3, in which curing is completed. In the induction phase P1, the viscosity of the thermosetting composition does not change while remaining at a low viscosity, and in the initial phase of curing P2, a remarkable viscosity change from a low viscosity to a high viscosity is exhibited, and in the latter phase of curing P3, the viscosity increases slowly in a state of a high viscosity.

In the curing initial P2, not only a viscosity change in which the thermosetting composition changes from a liquid to a solid but also a volume change occurs, thereby shrinking. Therefore, in the actual molding, without applying pressure to the thermosetting composition, the molded article is inferior in transferability. In order to improve transferability, it is preferable that a pressure be applied to the thermosetting composition (holding pressure), and that the thermosetting composition be brought into close contact with the mold 20 and the thermosetting composition be supplemented from the gate part.

However, in the thermosetting composition of the embodiment, when pressure is applied in a low-viscosity state, the raw material leaks from the gap between the fixed mold 22 and the movable mold 23 and hardens (burrs), or malfunction of the extrusion pin due to penetration of the thermosetting composition into the gap around the extrusion pin may occur. On the other hand, even when a pressure is applied in a state in which the viscosity is increased at the initial phase of curing P2 or in a state of the latter phase of curing P3, the viscosity of the thermosetting composition is high, so that the thermosetting composition cannot be compressively deformed and the transferability cannot be improved. Therefore, in order to obtain a molded article having a high transferability, it is preferable to adjust the timing of the start of holding pressure (holding pressure start time T) to the timing of shifting from the induction phase P1 to the initial phase of curing P2 of the curing step.

Here, if the viscosity of the thermosetting composition in the cavity 21 can be detected, the holding pressure start time T can be determined.

The thermosetting composition in the embodiment thickens at an initial phase of curing P2 and starts to shrink at the same time, so that it is preferable to detect a time to start shrinking. As a result, the holding pressure start time T can be appropriately determined.

In the curing step, by holding pressure under the above-mentioned conditions, sinking and distortion of the molded article can be prevented, and the transferability can be improved.

After completion of the holding pressure for a certain period of time, the needle 223 is advanced as shown in FIG. 2(C) to close the opening 222, and the thermosetting composition is heated for a certain period of time to complete curing so as not to generate an uncured portion.

Here, by advancing the plunger 11, the thermosetting composition is filled in the cavity 21 of the mold 20, the time required for filling is defined as $t_1$. When the filling is completed, the plunger 11 stops. Further, when curing of the thermosetting composition is started, shrinking of the thermosetting composition occurs at the same time, so that the plunger 11 which has stopped after completion of the filling step starts advancing again. The time required from the completion of the filling step until the plunger 11 starts to advance again due to shrinking is defined as $t_2$. When the time required to completely cure the thermosetting composition by further heating is defined as $t_3$, $t_1+t_2+t_3$ (the total time required for the filling and curing steps) is preferably 0.2 minutes to 3 minutes. The total time is more preferably 0.2 minutes to 2 minutes. When the total time is 0.2 minutes or less, uncured may occur, and when the total time is 3 minutes or more, it is not preferable from the viewpoint of mass productivity.

The releasing step is shown, for example, in FIG. 2(D).

By separating the movable mold 23 from the fixed mold 22, it is possible to take out the cured product in the cavity. If the releasability is poor, an ejector may be provided in the mold as appropriate.

The cured product of the invention can be produced using the thermosetting composition described above.

The cured product of the invention is preferably a molded article.

The cured product of the invention is preferably soft from the viewpoints of breakage of the sealing material, crack prevention, and shock absorption of vibration due to deformation of the substrate. In the cured product of the invention, the hardness is preferably low, and is preferably 30 to 100, more preferably 30 to 85, with the hardness of the type A durometer conforming to JIS K7215

The cured product of the invention can be suitably used, for example, as a seal of an electronic circuit device, a seal of an electronic circuit board, or the like. An electronic circuit device and an electronic circuit board using the cured product of the invention is excellent in gas barrier properties.

EXAMPLES

Hereinafter, examples of the invention will be described in further detail with reference to Examples of the invention, but the invention is not limited to these Examples.

Examples 1 to 9 and Comparative Examples 1 to 7

(Preparation of a Thermosetting Composition)

A component (A), a component (A'), a component (B), and a component (C) were blended in the blending amounts shown in Tables 1 and 2 to prepare a thermosetting composition. In Tables 1 and 2, the blending amount of a component (A) (or component (A')) and a component (C) indicates the blending amount of each of a component (A) (or a component (A')) and a component (C) based on 100% by mass of the total blending amount of a component (A) (or component (A')) and a component (C).

In addition, in Tables 1 and 2, the blending amount of a component (B) indicates the blending amount of a component (B) based on 100 parts by mass of the total blending amount of a component (A) (or component (A')) and a component (C).

Specifically, in the preparation of the thermosetting composition, first, a component (A) (or component (A')) and a component (C) were weighed, respectively, and were mixed and stirred. Next, a component (B) was weighed and added, and finally stirred to obtain a thermosetting composition.

As the stirring device, a stirring device capable of stirring by rotation and revolution was used. The rotation speed was 1000 rpm in rotation and 2000 rpm in revolution. The rotation time was 1 minute.

The followings were used as a component (A):

A1: LIGHT ACRYLATE PBD-A (manufactured by KYOEISHA CHEMICAL Co., LTD., polymer represented by the following structural formula A1, l1/m1/n1=21/22/57 (molar ratio), viscosity at 25° C.: 10 Pa·s)

A1

A2: CN307 (manufactured by Sartomer, polymer represented by the following structural formula A2, l2/m2/n2=70/12/18 (molar ratio), random copolymer, viscosity at 25° C.: 8.5 Pa·$)

A2

The following was used as component (A'):
A'1: KE-200 (manufactured by Shin-Etsu Chemical Co., Ltd., a silicone material)
A'2: KE-1282-A/B (manufactured by Shin-Etsu Chemical Co., Ltd., a silicone material)
A'3: KE-1012-A/B (manufactured by Shin-Etsu Chemical Co., Ltd., a silicone material)
A'4: SU-2180A/B (manufactured by SANYU REC. LTD., urethane material)
A'S: UF-705A/B (manufactured by SANYU REC. LTD., urethane material)
A'6: SU-3900A/B (manufactured by SANYU REC. LTD., urethane material)

The followings were used as a component (C):
Light ester IB-X: 1-isobornyl methacrylate (manufactured by KYOEISHA CHEMICAL Co., LTD., viscosity at 25° C.: 5 mPa·s)

A-DOD-N: 1,10-decanediol diacrylate (manufactured by Shin-Nakamura Chemical Co., Ltd., viscosity at 25° C.:10 mPa·s) Light ester L: 1-lauryl methacrylate (manufactured by KYOEISHA CHEMICAL Co., LTD., viscosity at 25° C.: 5 mPa·s) BLEMMER GH: glycidyl methacrylate (manufactured by NOF CORPORATION)

The followings were used as a component (B):

B1: PEROYL TCP (manufactured by NOF CORPORATION, a compound represented by the following formula B1)

B1

B2: PEROYL L (manufactured by NOF CORPORATION, a compound represented by the following formula B2)

B2

B3: PERHEXA HC (manufactured by NOF CORPORATION, a compound represented by the following formula B3)

B3

For a component (A) and a component (C), the viscosities were measured in accordance with JIS K7117-2 using a viscoelastic measuring device Physica MCR301 (manufactured by Anton Paar GmbH) under the condition described below at the shear rate 10 s$^{-1}$.

Measuring method: Cylindrical-type rotational viscosity measuring method

Temperature: 25° C.

Shear rate range: 10 to 100 s$^{-1}$ (Viscosity Measurement of a Thermosetting Composition)

For the obtained thermosetting compositions, the viscosity was measured in accordance with JIS K7117-2 using a viscoelastic measuring device Physica MCR301 (manufactured by Anton Paar GmbH) under the condition described below at each shear rate 10 s$^{-1}$, 20 s$^{-1}$, 30 s$^{-1}$, 40 s$^{-1}$, 50 s$^{-1}$, 60 s$^{-1}$, 70 s$^{-1}$, 80 s$^{-1}$, 90 s$^{-1}$, and 100 s$^{-1}$.

The results are shown in Tables 1 and 2.

Measuring method: Cylindrical-type rotational viscosity measuring method

Temperature: 25° C.

Shear rate range: 10 to 100 s$^{-1}$ (Manufacture of a Molded Article 1)

The thermosetting composition described above was subjected to LTM molding or LIM molding under the following conditions to obtain a molded article (cured product) 1.

The mold was a mold having a width of 10 mm, a length of 50 mm, and a thickness of 1 mm, and as the flow end portion, a mold having a vent portion having a width of 5 mm, a length of 10 mm, and a thickness of 0.03 mm was used.

The LTM molding was performed under the following conditions. In Table 1, the "method of manufacturing the molded article" is indicated as LTM for the molded article 1 subjected to the LTM molding.

Molding Machine: Liquid transfer molding machine G-Line (manufactured by APIC YAMADA CORPORATION)

Weighing with the plunger in the molding machine: 1.5 g
Flow path temperature of the low-temperature part: 25° C.
Flow path and blocking method: manual blocking using a syringe
Flow path temperature of the high-temperature part and cavity temperature: temperature shown in Table 1
Filling pressure: 10 MPa or less
Holding time: 15 seconds
Holding pressure: 15 MPa
Curing time: Time shown in Table 1

The LIM molding was performed under the following conditions. In Tables 1 and 2, the "method of manufacturing the molded article" is indicated as LIM for the molded article 1 subjected to the LIM molding.

Molding machine: Liquid thermosetting resin injection molding machine LA-40S (manufactured by Sodick Co., Ltd.)

Weighing with the plunger in the molding machine: 1.1 g
Flow path temperature of the low-temperature part: 15° C.
Flow path and thermal isolation method: blocking using a shut-off nozzle
Flow path temperature of the high-temperature portion and cavity temperature: temperature shown in Table 1 and 2
Filling pressure: 10 MPa or less
Holding time: 15 seconds
Holding pressure: 15 MPa
Curing time: time shown in Tables 1 and 2

(Evaluation of Fillability)

In the filling of the thermosetting composition for manufacturing the molded article 1 described above, the fillability was visually confirmed. The case where no void was generated and no unfilled was occurred was defined as "0 (good)." The case where voids were generated or unfilled were occurred was defined as "A (poor)." The case where voids were generated and unfilled was occurred was defined as "x (bad)".

(Measurement of Hardness)

For the molded article 1 described above, the hardness of the Type A durometer was measured using a AskerP2-A type (manufactured by KOBUNSHI KEIKI CO., LTD.) confirming to JIS K7215

The results are shown in Tables 1 and 2.

(Manufacture of a Molded Article 2)

A molded article was manufactured in the same manner as in the manufacture of the molded article 1 except that the following mold was used. The obtained molded article was referred to as a molded article 2.

As the mold, a mold having a length of 50 mm, a width of 50 mm, and a thickness of 2 mm was used.

(Evaluation of Water Vapor Permeability)

The water vapor permeability of the molded article 2 was evaluated in accordance with the method B of JIS K7129. The case when the value obtained is 20 g/m$^2$·1 day or lower was indicated as O. The case when the value obtained is higher than 20 g/m$^2$·1 day was indicated as X.

The results are shown in Tables 1 and 2.

(Evaluation of Boiling Water Content)

For the above-mentioned molded article 2, the boiling water content was evaluated in accordance with the method B of JIS K7209. The case when the obtained boiling water content was less than 1% by weight was indicated as 0. The case when the obtained boiling water content was 1% by weight or more was indicated as X.

The results are shown in Tables 1 and 2.

TABLE 1

| | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Component (A) | A1 | 90 | 70 | — | — | 70 | 70 | 70 | 70 | 60 |
| | A2 | — | — | 70 | 70 | — | — | — | — | — |
| Component (A') | A'1 | — | — | — | — | — | — | — | — | — |
| | A'2 | — | — | — | — | — | — | — | — | — |
| | A'3 | — | — | — | — | — | — | — | — | — |
| | A'4 | — | — | — | — | — | — | — | — | — |
| | A'5 | — | — | — | — | — | — | — | — | — |
| | A'6 | — | — | — | — | — | — | — | — | — |
| Component (C) | IB-X | 10 | — | — | — | — | — | — | — | — |
| | A-DOD-N | — | 30 | 30 | 30 | — | 20 | 20 | 20 | 10 |
| | Light ester L | — | — | — | — | 30 | — | — | — | 20 |
| | BLEMMER GH | — | — | — | — | — | 10 | 10 | 10 | 10 |
| Component (B) | B1 | 1 | 1 | — | 1 | 1 | 1 | — | — | 1 |
| | B2 | — | — | 0.8 | — | — | — | 0.8 | — | — |
| | B3 | — | — | — | — | — | — | — | 1 | — |
| Viscosity of the thermosetting composition (Pa · s) | 10 s$^{-1}$ | 2.4 | 1.0 | 0.9 | 0.9 | 0.9 | 0.9 | 0.9 | 0.9 | 0.7 |
| | 20 s$^{-1}$ | 2.4 | 1.0 | 0.9 | 0.9 | 0.9 | 0.9 | 0.9 | 0.9 | 0.7 |
| | 30 s$^{-1}$ | 2.4 | 1.0 | 0.9 | 0.9 | 0.9 | 0.9 | 0.9 | 0.9 | 0.7 |
| | 40 s$^{-1}$ | 2.4 | 1.0 | 0.9 | 0.9 | 0.9 | 0.9 | 0.9 | 0.9 | 0.7 |
| | 50 s$^{-1}$ | 2.4 | 1.0 | 0.9 | 0.9 | 0.9 | 0.9 | 0.9 | 0.9 | 0.7 |
| | 60 s$^{-1}$ | 2.4 | 1.0 | 0.9 | 0.9 | 0.9 | 0.9 | 0.9 | 0.9 | 0.7 |
| | 70 s$^{-1}$ | 2.4 | 1.0 | 0.9 | 0.9 | 0.9 | 0.9 | 0.9 | 0.9 | 0.7 |
| | 80 s$^{-1}$ | 2.4 | 1.0 | 0.9 | 0.9 | 0.9 | 0.9 | 0.9 | 0.9 | 0.7 |
| | 90 s$^{-1}$ | 2.4 | 1.0 | 0.9 | 0.9 | 0.9 | 0.9 | 0.9 | 0.9 | 0.7 |
| | 100 s$^{-1}$ | 2.4 | 1.0 | 0.9 | 0.9 | 0.9 | 0.9 | 0.9 | 0.9 | 0.7 |

TABLE 1-continued

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Method of manufacturing the molded article | LIM | LIM | LTM | LIM | LIM | LIM | LIM | LIM | LIM |
| Flow path temperature of the high-temperature part and cavity temperature (° C.) | 90 | 90 | 120 | 90 | 90 | 90 | 120 | 120 | 90 |
| Curing time (min) | 2 | 2 | 2 | 2 | 2 | 2 | 2 | 2 | 2 |
| Fillability | ○ | ○ | ○ | ○ | ○ | ○ | ○ | ○ | ○ |
| Hardness | 60 | 50 | 50 | 50 | 90 | 60 | 60 | 60 | 70 |
| Water vapor permeability | ○ | ○ | ○ | ○ | ○ | ○ | ○ | ○ | ○ |
| Boiling water content | ○ | ○ | ○ | ○ | ○ | ○ | ○ | ○ | ○ |

TABLE 2

|  |  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| Component (A) | A1 | — | — | — | — | — | — | 70 |
|  | A2 | — | — | — | — | — | — | — |
| Component (A') | A'1 | 100 | — | — | — | — | — | — |
|  | A'2 | — | 100 | — | — | — | — | — |
|  | A'3 | — | — | 100 | — | — | — | — |
|  | A'4 | — | — | — | 100 | — | — | — |
|  | A'5 | — | — | — | — | 100 | — | — |
|  | A'6 | — | — | — | — | — | 100 | — |
| Component (C) | IB-X | — | — | — | — | — | — | — |
|  | A-DOD-N | — | — | — | — | — | — | 20 |
|  | Light ester L | — | — | — | — | — | — | — |
|  | BLEMMER GH | — | — | — | — | — | — | 10 |
| Component (B) | B1 | — | — | — | — | — | — | — |
|  | B2 | — | — | — | — | — | — | — |
|  | B3 | — | — | — | — | — | — | — |
| Viscosity of the thermosetting composition (Pa·s) | 10 s$^{-1}$ | 2.8 | 2.1 | 0.9 | 1.1 | 2.4 | 6.4 | 0.9 |
|  | 20 s$^{-1}$ | 2.8 | 2.1 | 0.9 | 1.1 | 2.4 | 6.4 | 0.9 |
|  | 30 s$^{-1}$ | 2.8 | 2.1 | 0.9 | 1.1 | 2.4 | 6.4 | 0.9 |
|  | 40 s$^{-1}$ | 2.8 | 2.1 | 0.9 | 1.1 | 2.4 | 6.4 | 0.9 |
|  | 50 s$^{-1}$ | 2.8 | 2.1 | 0.9 | 1.1 | 2.4 | 6.4 | 0.9 |
|  | 60 s$^{-1}$ | 2.8 | 2.1 | 0.9 | 1.1 | 2.4 | 6.4 | 0.9 |
|  | 70 s$^{-1}$ | 2.8 | 2.1 | 0.9 | 1.1 | 2.4 | 6.4 | 0.9 |
|  | 80 s$^{-1}$ | 2.8 | 2.1 | 0.9 | 1.1 | 2.4 | 6.4 | 0.9 |
|  | 90 s$^{-1}$ | 2.8 | 2.1 | 0.9 | 1.1 | 2.4 | 6.4 | 0.9 |
|  | 100 s$^{-1}$ | 2.8 | 2.1 | 0.9 | 1.1 | 2.4 | 6.4 | 0.9 |
| Method of manufacturing the molded article |  | LIM | LIM | LIM | LIM | LIM | LIM | LIM |
| Flow path temperature of the high-temperature part and cavity temperature (° C.) |  | 50 | 90 | 110 | 80 | 80 | 80 | 150 |
| Curing time (min) |  | 4210 | 120 | 30 | 60 | 180 | 120 | 30 |
| Fillability |  | x | ○ | ○ | ○ | ○ | ○ | ○ |
| Hardness |  | 25 | 10 | — | 50 | 40 | 70 | 60 |
| Water vapor permeability |  | x | x | x | ○ | ○ | ○ | ○ |
| Boiling water content |  | x | x | x | ○ | ○ | ○ | ○ |

In Examples 1 to 9, the fillability was good and curing time was short, and a good molded article was obtained.

On the other hand, although the fillability of Comparative Examples 2 to 7 was good, the curing time was longer compared to Examples 1 to 9. Further, in Comparative Example 1, since the fillability was not good, the curing time was long.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The invention claimed is:

1. A method of manufacturing a molded article, comprising: supplying a thermosetting composition into a plunger;
filling the supplied thermosetting composition into a depressurized molding part of a mold by the plunger; and
thermosetting the filled thermosetting composition in the molding part, wherein the thermosetting composition comprises the following component (A) and component (B), and
has a viscosity of 0.1 Pa·s or higher and 100 Pa·s or lower at a shear rate of 10 s$^{-1}$ at 25° C. measured in accordance with JIS K7117-2, (A) polybutadiene having a structural unit represented by the following formula (1A) and a structural unit represented by the following formula (1B), wherein the terminal group comprises a methacryloyl group or an acryloyl group;

(B) a thermal polymerization initiator;

(1A)

(1B)

2. The method of manufacturing a molded article according to claim 1, wherein the temperature of the mold part constituting the molding part is 50 to 150° C.

3. The method of manufacturing a molded article according to claim 1, wherein a flow path controlled at a temperature of 50° C. or less is provided between the plunger and the molding part, and the filling is performed through the flow path.

4. The method of manufacturing a molded article according to claim 3, wherein the flow path has a gate system for blocking the flow of the thermosetting composition and the transfer of heat.

5. The method of manufacturing a molded article according to claim 4, wherein the filling is performed by opening a gate of the gate system; and
   in the thermosetting, pressure retention is performed; and after the pressure retention, the gate of the gate system is closed to complete thermosetting.

6. The method for manufacturing a molded article according to claim 1, wherein the step of filling and the step of thermosetting are performed in 0.2 to 3 minutes.

* * * * *